(12) United States Patent  (10) Patent No.: US 8,549,281 B2
Samovskiy et al.  (45) Date of Patent: Oct. 1, 2013

(54) SYSTEM AND METHODS FOR ENABLING CUSTOMER NETWORK CONTROL IN THIRD-PARTY COMPUTING ENVIRONMENTS

(75) Inventors: Dmitriy Samovskiy, Mundelein, IL (US); Patrick Kerpan, Wilmette, IL (US); Dwight Koop, St. Charles, IL (US); Nicholas Clements, Buffalo Grove, IL (US)

(73) Assignee: Cohesive Flexible Technologies Corporation, Chicago, IL (US)

( * ) Notice: Subject to any disclaimer, the term of this patent is extended or adjusted under 35 U.S.C. 154(b) by 953 days.

(21) Appl. No.: 12/589,315

(22) Filed: Oct. 21, 2009

(65) Prior Publication Data

US 2010/0115606 A1   May 6, 2010

Related U.S. Application Data

(60) Provisional application No. 61/107,274, filed on Oct. 21, 2008, provisional application No. 61/108,972, filed on Oct. 28, 2008.

(51) Int. Cl.
*H04L 12/24* (2006.01)
*H04L 12/66* (2006.01)

(52) U.S. Cl.
USPC .................. 713/151; 713/152; 726/15

(58) Field of Classification Search
None
See application file for complete search history.

(56) References Cited

PUBLICATIONS

Science Clouds: Early Experiences in Cloud Computing for Scientific Applications. Keahey et al. Aug. 28, 2008.*
IEEE Search Results.Aug. 14, 2012.*
ACM Search Results.Aug. 14, 2012.*
Security Framework for Provider-Provisioned Virtual Private Networks(PPVPNs). L. Fang. The Internet Society. Jul. 14, 2005.*

* cited by examiner

*Primary Examiner* — Venkat Perungavoor
(74) *Attorney, Agent, or Firm* — Jeffrey A. Pine; Dykema Gossett PLLC

(57) ABSTRACT

The present invention relates to a system and methods for enabling a user control in third-party computing environments or cloud computing via a virtual private network created by a control module, which contains parameters defined by the user. The system and methods are used to create a fault tolerant virtual private network that allows user control over addressing, security encryption, routing, and the enablement of multicast protocols, regardless of the prohibition set by the third-party computing environment.

26 Claims, 22 Drawing Sheets

VPN-Cubed Administration Tool
cohesiveFT

Public | Private IP:
67.202.15.153 | 10.249.186.213

Status
Runtime Status

SSL Certs and Keys
Fetch Keyset
Generate New

Peering
Set up Manager Peering

Clients
Client Packs

Introduction

SSL Certificates and Keys

Each instance of VPN-Cubed Manager must be configured with a set of SSL keys and certificates ("keyset"). If the keyset for this topology has already been generated, use Fetch Keyset link on the left to download it from another manager instance in this topology.

Otherwise, use Generate New link to create a new set which you will need to distribute to other managers If keys are set up, both links will no longer be available. If a manager instance is configured with a keyset, it can not be re-configured to use another keyset (this may change in future versions of VPN-cubed Administration Tool).

Peering

After a keyset is set up, proceed to Set up Manager Peering where you will tell each manager about its peers. Peering must be set up indivudually on each manager, using the same order.

FIG. 11

VPN-Cubed Administration Tool
cohesiveFT

Status
Runtime Status

SSL Certs and Keys
Fetch Keyset
Generate New

Peering
Set up Manager Peering

Generate New Keyset

Make sure to run this step only once for each VPN-Cubed topology that you are planning to maintain.

If you already generated keys on another VPN-Cubed Manager and want this host to join existing topology please download keys instead of generating new ones.

A total of 50 keys will be generated.

(Generate Keys)

---

VPN-Cubed Administration Tool
cohesiveFT

Status
Runtime Status

SSL Certs and Keys
Fetch Keyset
Generate New

Peering
Set up Manager Peering

Clients
Client Packs

Command Output

Refresh this page to get latest log entries

```
Starting cert generation process
This may take some time
Please allow up to several minutes
Look for 'Generation process completed' to indicate successful completion.
Setting up certificate infrastructure. . .
```

Last Updated: Fri Feb 13 23:20:22 +0000 2009
Current Server Time: Fri Feb 12 23:20:40 +0000 2009

FIG. 12

VPN-Cubed Administration Tool
cohesiveFT

Status
Runtime Status

SSL Certs and Keys
Fetch Keyset
Generate New

Peering
Set up Manager Peering

Peering Setup

Manager #1 [ this instance ]
Manager #2 [ specify IP or DNS name ] [ ec2-174-129-108-32.com ]
Manager #3 [ specify IP or DNS name ] [ ec2-79-125-53-74.eu-wes ]
Manager #4 [ specify IP or DNS name ] [ ec2-79-125-49-82.eu-wes ]

( Save changes )

---

VPN-Cubed Administration Tool
cohesiveFT

Status
Runtime Status

SSL Certs and Keys
Fetch Keyset
Generate New

Peering
Set up Manager Peering

Clients
Client Packs

Command Output

Refresh this page to get latest log entries
This is VPN-Cubed Manager, id=1
Reconfiguring OpenVPN....
No existing configuration detected.
Started client-facing VPN
This host is manager # 1
Manager #2 is at ec2-174-129-108-32.compute-1.amazonaws.com
Tunnel endpoint configured (S2).
Manager #3 is at ec2-79-125-53-74.eu-west-1.compute.amazonaws.com
Tunnel endpoint configured (S3).
Manager #4 is at ec2-79-125-49-82.eu.-west-1.compute.amazonaws.com Last Updated: Fri Feb 13 23:28:35 +0000 2009
Current Server Time: Fri Feb 12 23:28:36 +0000 2009

FIG. 13

VPN-Cubed Administration Tool
cohesiveFT

Status
Runtime Status

SSL Certs and Keys
Fetch Keyset
Generate New

Peering
Set up Manager Peering

Clients

Fetch Keyset

Enter IP address or DNS name of VPN-Cubed Manager from where keys can be downloaded. Connection will be made over port 8000, please make sure remote tcp port 8000 is currently open.

Download From: [         ]

(Download now)

---

VPN-Cubed Administration Tool
cohesiveFT

Status
Runtime Status

SSL Certs and Keys
Fetch Keyset
Generate New

Peering
Set up Manager Peering

Clients
Client Packs

Command Output

Refresh this page to get latest log entries

Fetching keys from ec2-67-202-15-153.compute-1.amazonaws.com
OK
Keyset checksum is fa400f959f2998e53ac225e8df46e787d897f53
Done Last Updated: Fri Feb 13 23:32:14 +0000 2009
Current Server Time: Fri Feb 12 23:32:15 +0000 2009

FIG. 14

VPN-Cubed Administration Tool
cohesiveFT

Status
Runtime Status

SSL Certs and Keys
Fetch Keyset
Generate New

Peering
Set up Manager Peering

Peering Setup

Manager #1 [specify IP or DNS name ▲▼] [ec2-67-202-15-153.comp]

Manager #2 [this instance ▲▼]

Manager #3 [specify IP or DNS name ▲▼] [ec2-79-125-53-74.eu-wes]

Manager #4 [specify IP or DNS name ▲▼] [ec2-79-125-49-82.eu-wes]

(Save changes)

---

VPN-Cubed Administration Tool
cohesiveFT

Status
Runtime Status

SSL Certs and Keys
Fetch Keyset
Generate New

Peering
Set up Manager Peering

Clients
Client Packs

Command Output

Refresh this page to get latest log entries

This is VPN-Cubed Manager, id=2
Reconfiguring OpenVPN....
No existing configuration detected.
Started client-facing VPN
Manager #1 is at ec2-67-202-15-153.compute-1.amazonaws.com
Tunnel endpoint configured (C1).
This host is manager #2
Manager #3 is at ec2-79-125-53-74.eu-west-1.compute.amazonaws.com
Tunnel endpoint configured (S3).
Manager #4 is at ec2-79-125-49-82.eu.-west-1.compute.amazonaws.com
Tunnel endpoint configured (S4).
Configuring routing
Routing configured and started.

FIG. 15

- areCredentialsGenerated (manager-ip) returns boolean

- generateCredentials (manager-ip) returns array of generated addresses or error if failure or credentials are already generated

- fetchCredentials (to-manager, pre-shared-key, from-manager)

- peerManagers (manager1, manager2)

- managerStatus(manager-ip)

- managerLog(manager-ip, log name)

- uploadLicense (manager-ip, rebootflag)

- ipsecManagerDefineEndpoint (name, customer-gateway-address, natted-address)

-ipsecManagerDeleteEndpoint(name)

- ipsecManagerAddSubnet(endpoint-name, cidr-address)

- ipsecManagerDeleteSubnet(endpoint-name, cidr-address)

-ipsecManagerSetOptions(full-replacement-string)

-ipsecManagerSetParamater(foo-equals-bar-string)

FIG. 17

Routing

Queue

Protocol Retransmitter

SYSTEM AND METHODS FOR ENABLING CUSTOMER NETWORK CONTROL IN THIRD-PARTY COMPUTING ENVIRONMENTS

This application claims the benefit of U.S. Provisional Patent Applications Ser. Nos. 61/107,274, filed Oct. 21, 2008, entitled Cloud VPN (Virtual Private Network) For Securing Virtual Assets in Cloud-Computing Environments, Across Cloud Computing Environments, and Integrating to Private Enterprise Infrastructure, and 61/108,972, filed Oct. 28, 2008, entitled Cloud Multicast—Multicast Network Protocols Enabled and Supported in Third-Party Controlled (Cloud Computing, Utility Computing, and Other) Non-Multicast/Multicast Disabled Network Environments.

FIELD OF THE INVENTION

The present invention relates to a system and methods for enabling customer network control in a third-party computing environment. More specifically, the present invention relates to a system and methods for encapsulating customer devices, in a cloud computing environment, with a customer-controlled overlay network.

The present invention comprises one or more virtual networks within a cloud, which overlay an existing cloud network or networks. By creating a series of connections, redundant routes between a customer's devices and nodes can be established resulting in a network that can continue to route traffic to its destination even when one or potentially more of the connections fail. Further, multiple virtual networks can exist simultaneously without the risk that their internal settings will conflict, and the multiple virtual networks can be connected together to form a single larger network. These connections can be made even where the virtual networks are on different third party clouds or a private cloud. Theses connections can also integrate private infrastructure, owned, controlled, or used by the customer.

These virtual networks are created and controlled by a virtual network manager or cloud virtual private network (VPN) server, which can be made up of one or more modules, such as control interface modules, tunnel modules, routing modules, private infrastructure integrator modules, synchronization modules, mapping modules, queue modules, protocol transmitter modules, and topology interpreter modules, among others.

BACKGROUND OF THE INVENTION

Computing systems have become a critical component for success for nearly all businesses. In order to equip themselves with the needed computing resources, many businesses have deployed their own increasingly large and complex computing systems. However, these deployments require large upfront expenditures on computing infrastructure, such as, physical computer servers, physical networks, and physical storage, as well as, virtual servers, virtual networks, and virtual storage. Additionally, these deployments require continued expenditures on maintenance of the infrastructure.

Allocating resources for these computing expenditures becomes more vexing to businesses by the fact that these expenditures are often unpredictable. Expenditures on computing infrastructure often fail to deliver the promised performance. Furthermore, even when the promised performance is realized, the estimated demand for computing resources may have been inaccurate.

Where the demand was underestimated, outages and related expenses are likely to occur. And, the business must quickly make another investment in computing infrastructure in order to stop the outages. On the other hand, where the demand was overestimated, the business has made a large investment in rapidly depreciating infrastructure that is being unused or underutilized. The problem with estimating demand is further complicated by the reality that demand often fluctuates widely and, in certain cases, with little predictability.

Cloud computing, which is also known as utility computing or managed virtual servers, is a method for providing computing resources to customers that attempts to reduce or eliminate many of the costs associated with traditional deployments of computing systems. In cloud computing, the computing infrastructure is generally provided by a third-party provider, although, in certain instances the third-party provider can be the customer. The customer uses the provider's computing infrastructure in lieu of or in addition to their own.

Unlike systems where the customer owns the computing infrastructure and must make large upfront expenditures, cloud computing is usually billed on a subscription or pay-as-you-go basis. This model allows cloud computing customers to buy computing resources only when they need them, eliminating many of the earlier-discussed problems with estimating the demand and performance of a system. Further, the infrastructure is generally controlled and managed by the provider. As a result, the customer need not have the same level of in-house expertise that would otherwise be required if they were controlling and managing the infrastructure.

As an example—a business owner may want to analyze his or her sales transactions over the past year in order to find patterns and associations between products. For instance, it may be the case that when the business owner sells product A they also tend to sell product B. Software exists and is readily available that can find such a pattern, which can then be leveraged to the advantage of the business owner. However, this type of data mining can be processor intensive, and may take too long using the processing power available in the business-owner's infrastructure. Further, the expense and complexity of deploying a more powerful private infrastructure will likely exceed the benefit realizes by the business owner. Cloud computing allows the business owner to upload his or her sales records and data mining software onto a third-computing infrastructure, such as the Amazon EC2 cloud. By using the cloud, the business owner has access to computing power well beyond what is available on his or her private infrastructure and he or she only pays for the computing resources and that are actually used.

Despite the advantages to cloud computing, significant barriers to its adoption exist for many would-be customers. Because the infrastructure is generally controlled and managed by the provider, the customer is usually left with limited control and various security issues. Typically, a customer's control may be limited to starting, stopping, and booting the customer's virtual servers, and control of some local area network or virtual local area network security parameters with respect to network port ingress and egress. Consequently, the customer is restricted to the protocols supported by the cloud; key network and topology parameters, for example, addressing, encryption, routing, and enabling multicast protocols are thus beyond the customer's control. As a result, the customer's software may not work in a cloud computing environment without modification, if at all.

For example, a software application that expects to find its database server at IP address 10.0.0.1 will not function properly if the cloud assigns a different IP address to the database server. If the customer cannot change the IP address that the cloud assigns, the customer must rewrite and/or reconfigure the software application to look for the database server at the cloud-assigned IP address. In many instances, the costs of modifying the application to run in the cloud will outweigh the benefits of employing cloud computing, or at a minimum the costs will reduce the net benefits.

This lack of control poses a further barrier for would-be customers who wish to move their applications to a cloud computing environment. Specifically, the customer may lose control of the security of their data as it moves around the cloud computing environment. This poses a significant problem to anyone wanting to place confidential or sensitive data into a cloud computing environment.

For all the above reasons there is a need for a system that can both allow customers to run their applications in the cloud without modification to the application and to manage the security of their data in the cloud. The present invention satisfies these needs.

SUMMARY OF THE INVENTION

The present invention is a system and methods for enabling customer network control over key network parameters in third-party computing environments, even in environments where the third-party controls most, if not all, of the physical infrastructure and predominantly most, if not all, of the virtual infrastructure. A cloud computing infrastructure (cloud) is one type of such a third-party infrastructure.

The present invention comprises one or more virtual networks which encapsulate customer devices and nodes, usually virtual, within a cloud. These virtual networks are formed through one or more VPN connections, which overlay the existing cloud network. By creating a series of VPN connections, redundant routes between the customer's devices and nodes can be established resulting in a fault tolerant network, which can continue to route traffic to its destination even when one or potentially more of the VPN connections have failed.

Because devices and nodes are encapsulated within a virtual network, the creation of multiple virtual networks can exist simultaneously without the risk that their internal settings will conflict. Further, the multiple virtual networks can be connected together to form a single larger network. Such connections can be made even where the virtual networks are on different third party clouds or a private cloud. Additionally, the virtual networks can connect to the customers or other existing non-cloud computing infrastructure.

Creation of the virtual network is carried out by a virtual network manager or cloud VPN server. The virtual network manager comprises a series of modules, which can include but are not limited, to a control interface module, topology interpreter module, tunnel module, private infrastructure integrator module, routing module, synchronization module, mapping module, queue module, and protocol transmitter module.

Each module serves a unique function, specifically—the control interface module enables the customer to get and set various parameters which define the behavior of the virtual network. The control interface module can take a various forms, for example, a user interface (UI) or an application programming interface (API). The topology interpreter module ensures that a topology map is present on a device or node. And, the tunnel module ensures a topology keyset exists for the device or node. The private infrastructure integrator module allows a connection to be established between the virtual network in the cloud and the customer's private infrastructure. The routing module gets the dynamic routing protocol configuration files generated by the topology interpreter, installs them, and rates traffic. The synchronization module synchronizes keys and certificates, and allows servers to share needed information. The mapping module maps static IP addresses to a set of credentials.

The protocol transmitter module comprises a protocol sniffer and a protocol re-transmitter. The protocol sniffer intercepts traffic as it moves over the network, which is a physical network in the preferred embodiment, and then determines whether the traffic should be forwarded to the queue module for processing by the protocol re-transmitter. The protocol transmitter in turn accepts traffic placed in the queue module by the protocol sniffer and retransmits it, ready for distribution.

An object of the present invention is to provide a VPN, configured for use as a cloud VPN, controlled by a customer, within a single third-party controlled computing infrastructure. The control including, but not being limited to, encryption of network communication, addressing, and routing between nodes in the network.

Another object of the present invention is to provide a VPN configured for use as a cloud VPN, controlled by a customer, across multiple third party controlled infrastructure. The control including, but not being limited to, encryption of network communication, addressing, and routing between nodes in the network.

Another object of the present invention is to provide a VPN controlled by the customer across one or multiple third-party controlled networks and computing environments integrated to one or more instances of private infrastructure, owned, controlled, or used by the customer. The control including, but not being limited to, encryption of network communication, addressing, and routing between nodes in the network.

Another object of the present invention is to provide failover capability in the VPN, such that the failure of one or potentially more Cloud VPN servers does not interrupt the function of the VPN or reduce the control afforded to the customer.

Another object of the preset invention is to provide for the use of protocols that the third party infrastructure has explicitly disabled, disallowed, or attempted to block.

Another object of the preset invention is to provide for the use of software services that require and/or depend on multicast protocols in third party controlled infrastructures, optionally integrated to one or more instance of private infrastructure owned, controlled or used by the customer. This objective being met even where, the third party infrastructure has explicitly disabled, disallowed, or attempted to block these multicast-enabled software services.

The present invention and its attributes and advantages will be further understood and appreciated with reference to the detailed description below of presently contemplated embodiments, taken in conjunction with the accompanying drawings and the claims.

DESCRIPTION OF THE DRAWINGS

The invention can be better understood by reading the following detailed description of certain preferred embodiments, reference being made to the accompanying drawings in which:

FIG. 11 shows a graphical user interface in accordance with the present invention;

FIG. 12 shows a graphical user interface in accordance with the present invention;

FIG. 13 shows a graphical user interface in accordance with the present invention;

FIG. 14 shows a graphical user interface in accordance with the present invention;

FIG. 15 shows a graphical user interface in accordance with the present invention;

FIG. 17 shows an application programming interface prototype in accordance with the present invention;

DETAILED DESCRIPTION

A preferred embodiment of the present invention provides a user or customer network control over key network parameters in a cloud computing environment (a "cloud") even in environments where the cloud provider controls most, if not all, of the physical infrastructure and predominantly most, if not all, of the virtual infrastructure.

In general, the present invention relates to methods and systems in which one or more virtual networks overlay an existing cloud network or networks. Using a series of connections, redundant routes between customer's devices and nodes can be established resulting in a network that can continue to route traffic to its destination even when one or more of the connections fail. This configuration allows multiple virtual networks to exist simultaneously without the risk that their internal settings or addresses conflict, with the ability of multiple virtual networks to be connected together to form a single larger network, even when the virtual networks are on different third party clouds or a private cloud.

As described in detail below, these virtual networks are created and controlled by a virtual network manager or cloud VPN server. This manager or server can be made up of a number of modules that operate together to accomplish the system and methods of the present invention. Included in the system is one or more of the following modules: control interface modules, topology interpreter modules, tunnel modules, private infrastructure integrator modules, routing modules, synchronization modules, mapping modules, protocol transmitter modules, and queue modules, among others.

Figure 1:
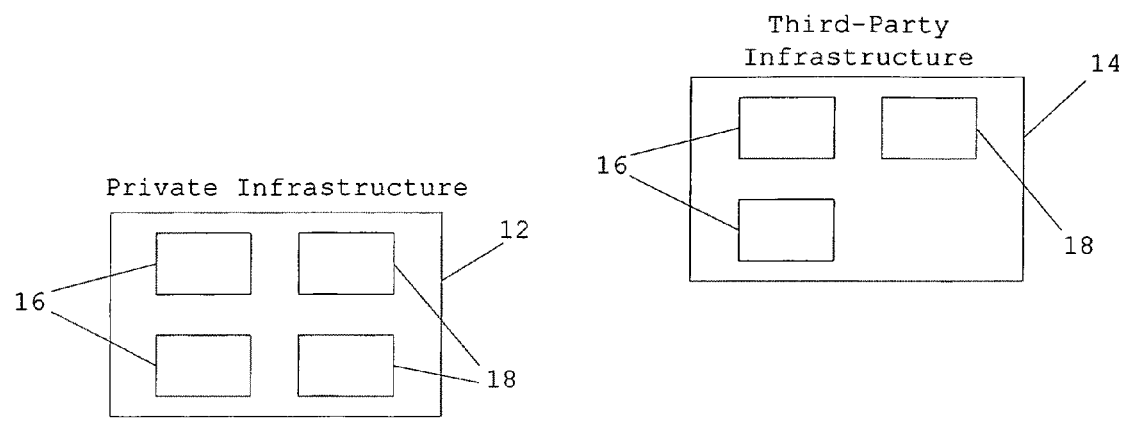
FIG. 1 shows a block diagram of private infrastructure and a third-party infrastructure.

FIG. 1 shows a private infrastructure 12 and a third-party cloud infrastructure 14. The private infrastructure 12 can include network devices 16, which include but are not limited to gateways, routers, bridges, switches, hubs, repeaters, and security devices. The private infrastructure 12 can also include nodes 18, which include but are not limited to computers (as further described in detail below), servers, virtual servers, communication servers, and graphics servers. Generally, within the private infrastructure, the customer has control over these devices and nodes and can set parameters such as addresses, protocol, topology, and security.

The third-party cloud infrastructure 14 can include similar network devices 16 and nodes 18 that are found in the private infrastructure 12. However, unlike the private infrastructure 12 the third-party cloud infrastructure 14 is controlled principally by the third party. Consequently, key parameters such as addresses, protocol, topology, and security are beyond the control of the customer. Even where the deployment is onto a cloud owned by the customer, control issues may exist. For example, administration of the cloud may be handled by persons independent of those carrying out the deployment. Thus, persons doing the deployment may have no more control over the cloud environment than they would if the cloud was owned by a third party. In such instances, the customer's cloud can be considered a third-party cloud for purposes of the present invention.

Figure 2:
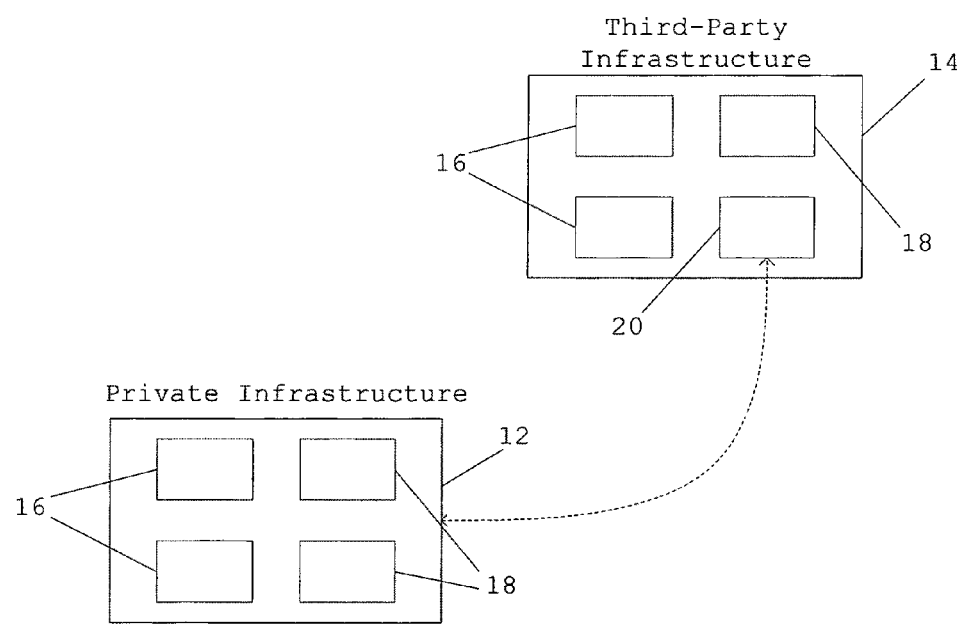
FIG. 2 shows a block diagram of private infrastructure and a third-party infrastructure and a connection for customer applications.

As shown in FIG. 2, an objective of cloud computing is to run applications in the cloud 14 that would otherwise be run on the private infrastructure 12. The customer may have applications that have been previously deployed on the private infrastructure 12, which they wish to migrate to the cloud 14. Or, they may be deploying new applications. Cloud-deployed applications run on one or more nodes with the cloud 20. Most often these nodes are virtual nodes. The collection of nodes and devices dedicated to the customer make up the customers assets within the cloud.

Figure 3:
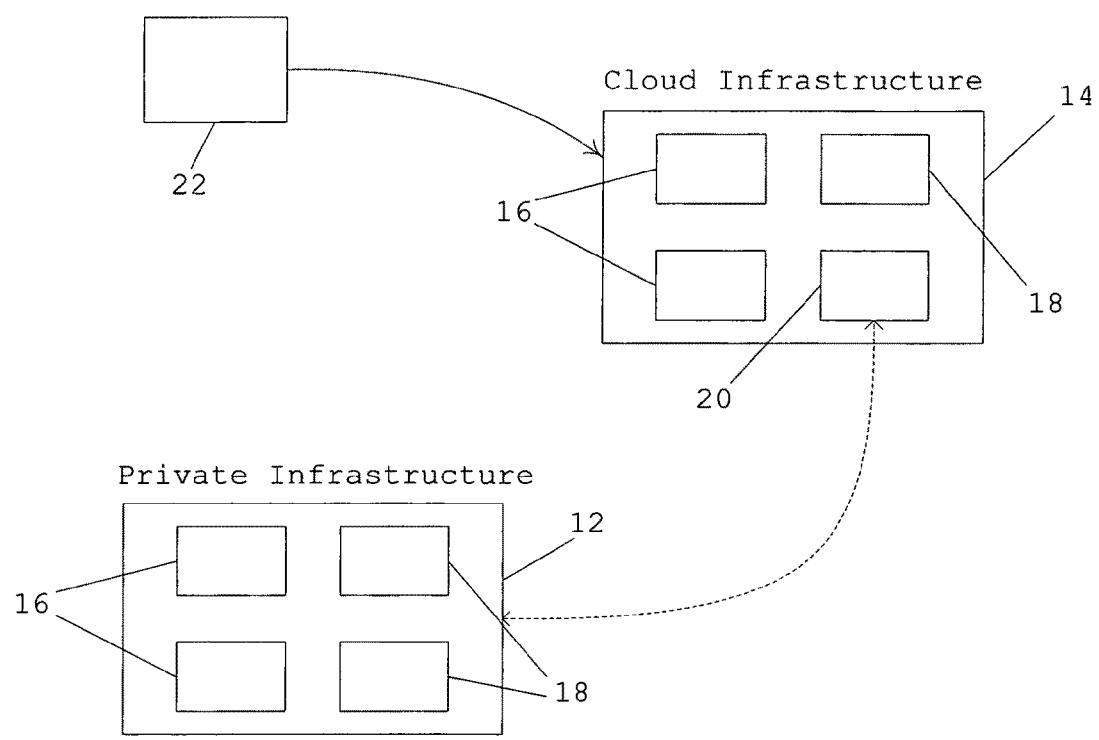
FIG. 3 shows a block diagram of private infrastructure, a third-party infrastructure, a desired direction of migration for customer applications, and a control module.

As shown in FIG. 3, it may be necessary for the customer to have a control module 22 to set certain key parameters within the cloud. Often these parameters must be set in order for the application to run properly and for the customer's data to be secured in a satisfactory manner. However, many clouds do not provide the customer such a control module.

Figure 4:
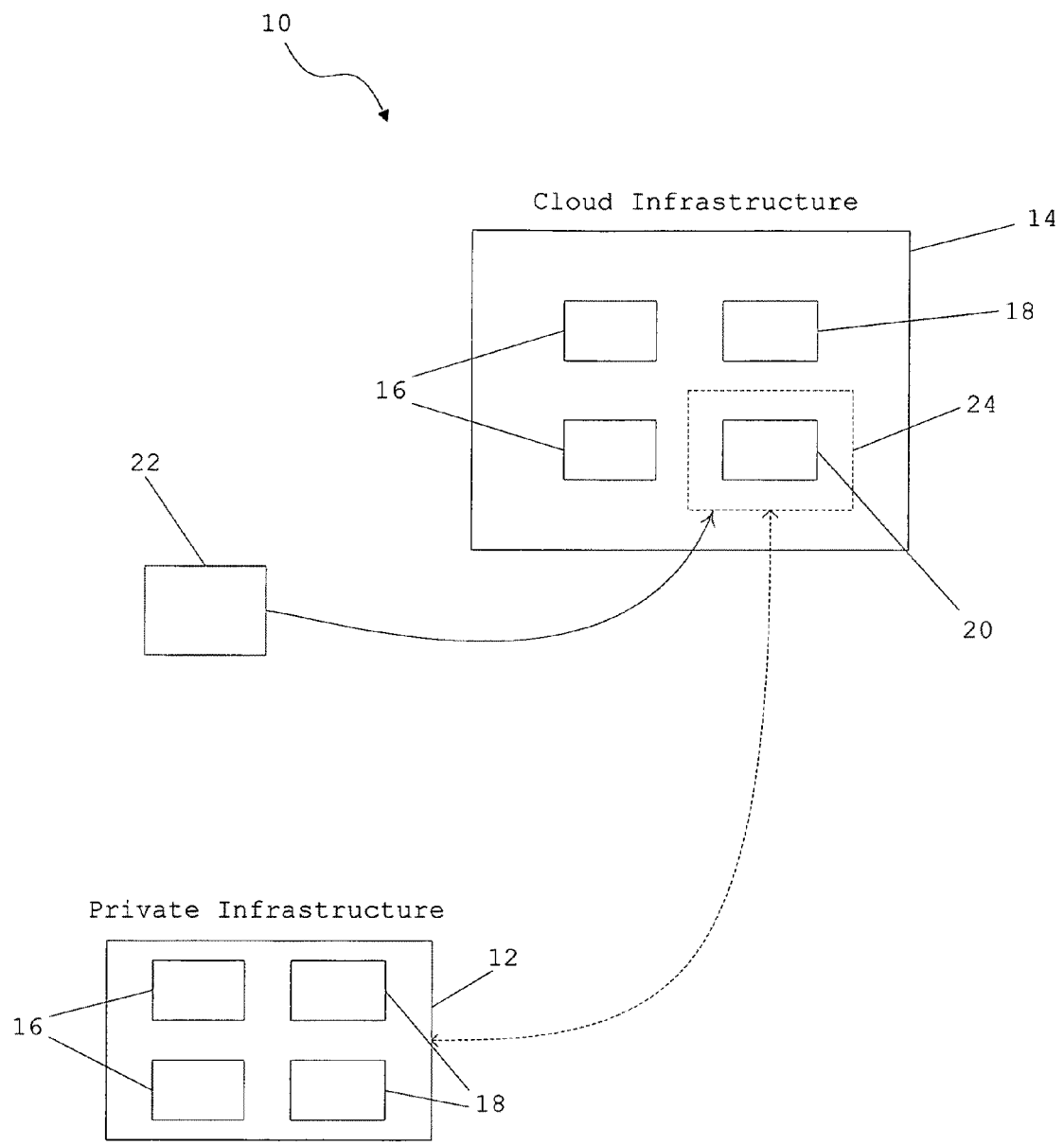
FIG. 4 shows a block diagram of private infrastructure and a third-party infrastructure, a connection for customer applications, a control module, and a virtual network in accordance with the present invention.

FIG. 4 shows the preferred embodiment of the invention 10 which provides the customer a control module 22, even where the cloud provider controls most, if not, all of the physical infrastructure and predominantly all of the virtual infrastructure. Within the cloud, the customer's assets are encapsulated by one or more virtual networks 24. This encapsulation is achieved by created virtual private network (VPN) connections between the customer's assets. These VPN connections create a second network 24, connecting the customers assets, layered over the existing cloud network. To create the VPN connections, software packages that are well known in the art, such as OpenVPN, can be used. It should be further noted, that while VPN connections have traditionally been employed to encrypt or otherwise secure data as it travels across a network, embodiments of the present invention may employ VPN connections that do not encrypt the data.

Because the virtual network 24 is a creation of the customer, its parameters can be defined by the customer, which enables the control module 22. Further, because the virtual network 24 operates as a network layered on top of the cloud network, the virtual network can use parameters different from the cloud parameters set by the third-party, even where the third party has explicitly disallowed a parameter that is enabled on the virtual network 24. Key network and topology parameters that the customer may define include but are not limited to addressing, encryption, routing, and enabling multicast protocols.

Traditionally, VPN connections have been employed to connect individual computers running externally from a customer's private infrastructure, or to connect two or more remote offices. Both of the cases involve running a single tunnel from the office to either an individual computer or another office. In these cases, if the VPN connection fails the connected resources are inaccessible to each other. Such approaches are not conducive to leveraging or controlling cloud computing infrastructures.

To solve this problem, the preferred embodiment of the present invention creates multiple VPN connections between assets, which results in a fault tolerant virtual network. These connections can be dedicated to management information and/or data. In such an embodiment, one or potentially more VPN connections can fail and the customer's assets will still be visible and accessible to each other with the same network configuration and security. Such fault tolerant embodiments are possible within a single cloud, across clouds, as well as in connection with private infrastructure.

Figure 5:
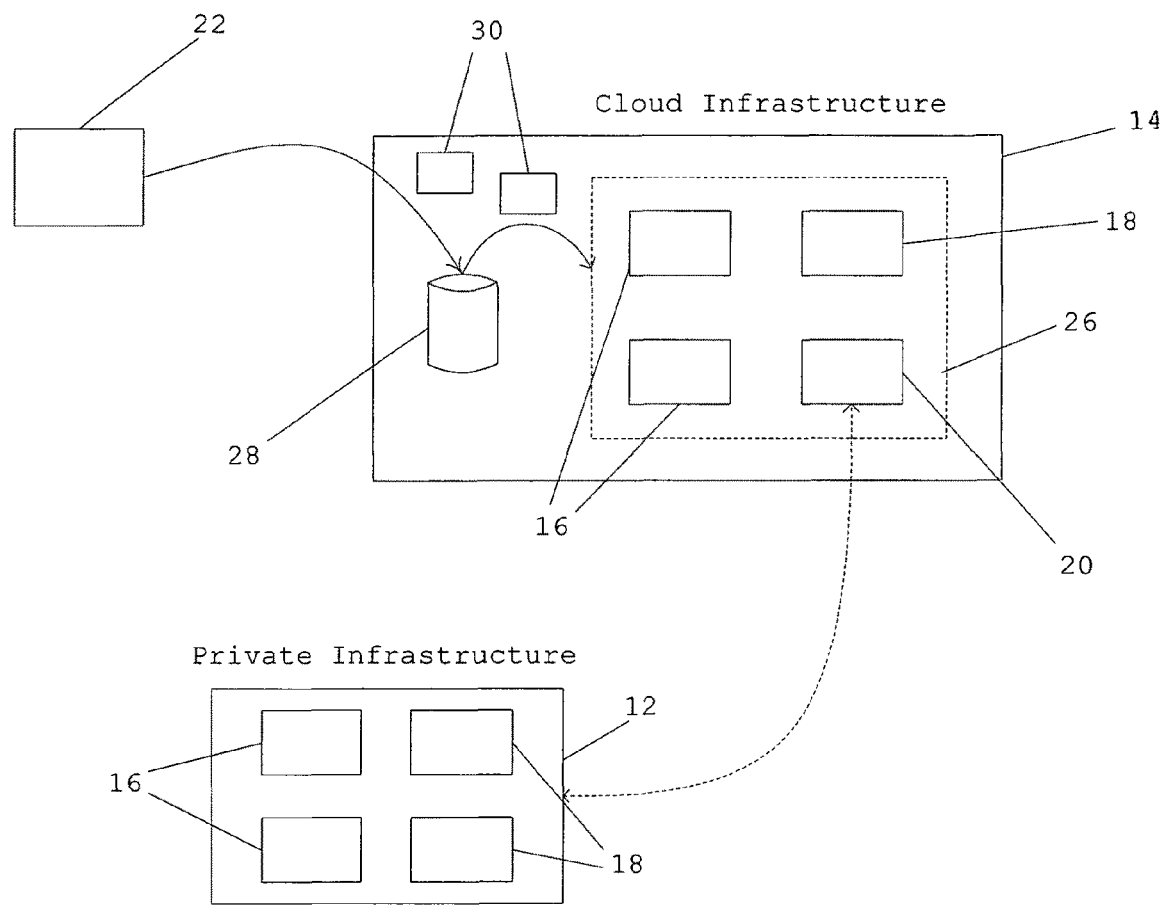
FIG. 5 shows a block diagram of private infrastructure, a third-party infrastructure, a connection for customer applications, a control module, and a database in accordance with the present invention.

FIG. 5 shows an alternative embodiment for providing the customer with a control module 22. In this embodiment, a database 28 is created which holds rules for directing customer data around the network. The customer is able to update the rules for their traffic through a user interface (UI) or an application programming interface (API). The control module can trigger actions in the functions and processes 30 which make changes to the database or use database information to perform actions on the physical devices to make them perform as multi-tenant devices. Changes to the database can trigger actions by the functions or processes 30 upon physical devices to perform as multi-tenant devices. These updates could be, but are not limited to, routing rules, security parameters, and tunnel descriptions which are only relevant to the traffic to/from the customer utilizing the control module. Single-tenant devices 16 are then able to act like multi-tenant devices by populating their rules from the rules in the database 28.

Figure 6:
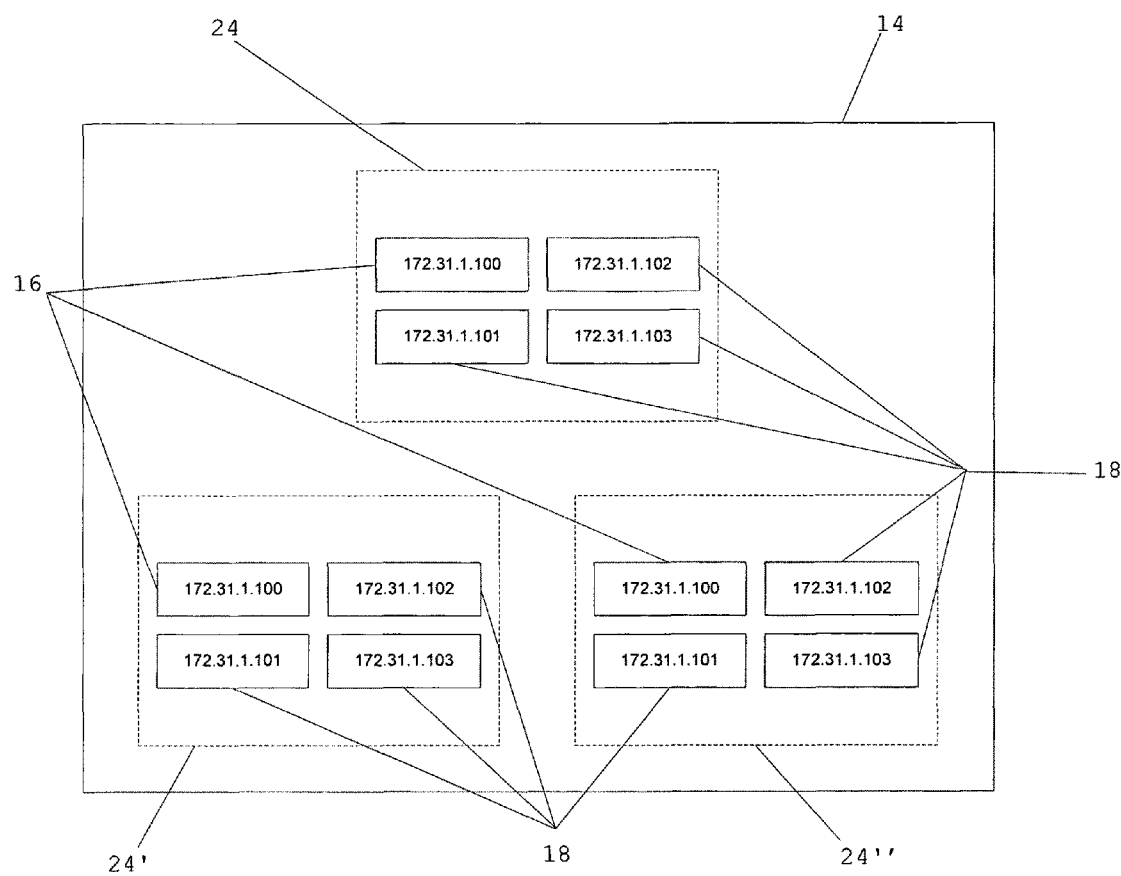
FIG. 6 shows a block diagram of multiple virtual networks inside one cloud in accordance with the present invention.

Referring back to the preferred embodiment illustrated in FIG. 4, multiple independent networks can run within a single cloud with settings that may otherwise conflict with each other. Such an embodiment is shown in FIG. 6, where three virtual networks 24, 24', 24" all have devices 16 and nodes 18 with the same IP address and the virtual networks are coexisting on the same cloud 14. The ability to configure multiple assets in the same way is advantageous when a customer wants deploy failover or test systems that mirror their production system.

Figure 7:
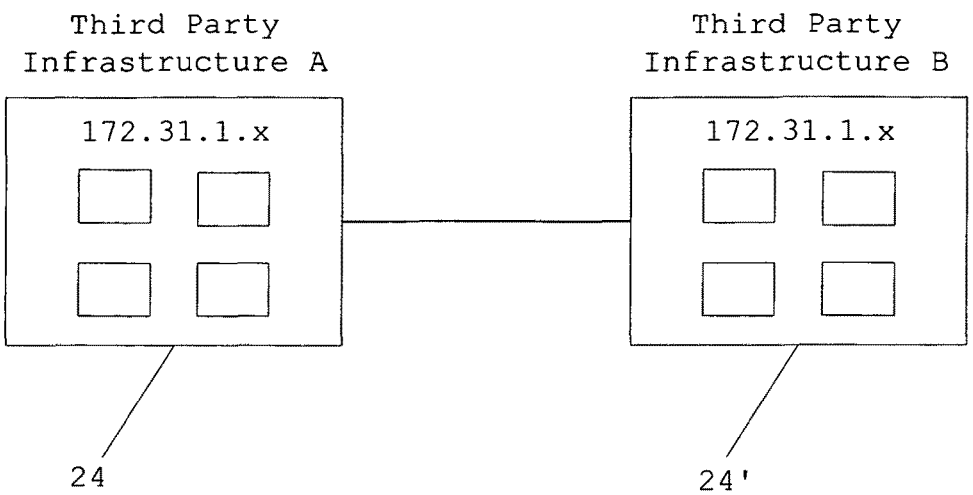
FIG. 7 shows a block diagram of two connected virtual networks in separate third-party clouds in accordance with the present invention.
Figure 8:
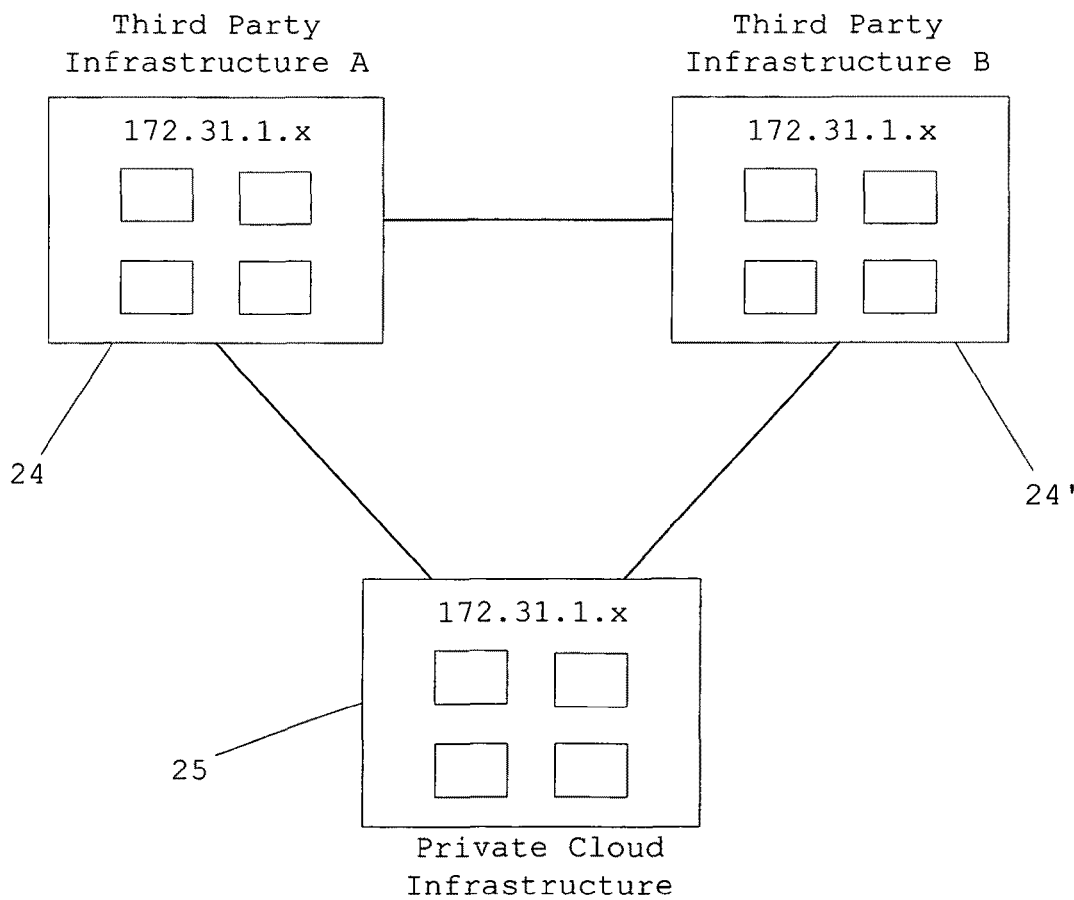
FIG. 8 shows a block diagram of three connected virtual networks in three separate clouds where two clouds are third-party clouds and one cloud is a private cloud in accordance with the present invention.

The virtual networks 24 can also be linked together to form a larger network that are collectively controlled by the client. FIG. 7 shows two virtual networks 24 and 24' running on two different clouds. The networks are connected together by a connection to form one larger network. As shown in FIG. 8 a private cloud can be used 25. In FIG. 8 two third-party clouds 24, 24' are joined together and in addition a private cloud 25 is joined. Such an embodiment allows the customer to utilize their existing infrastructure by converting it to a cloud.

Figure 9:
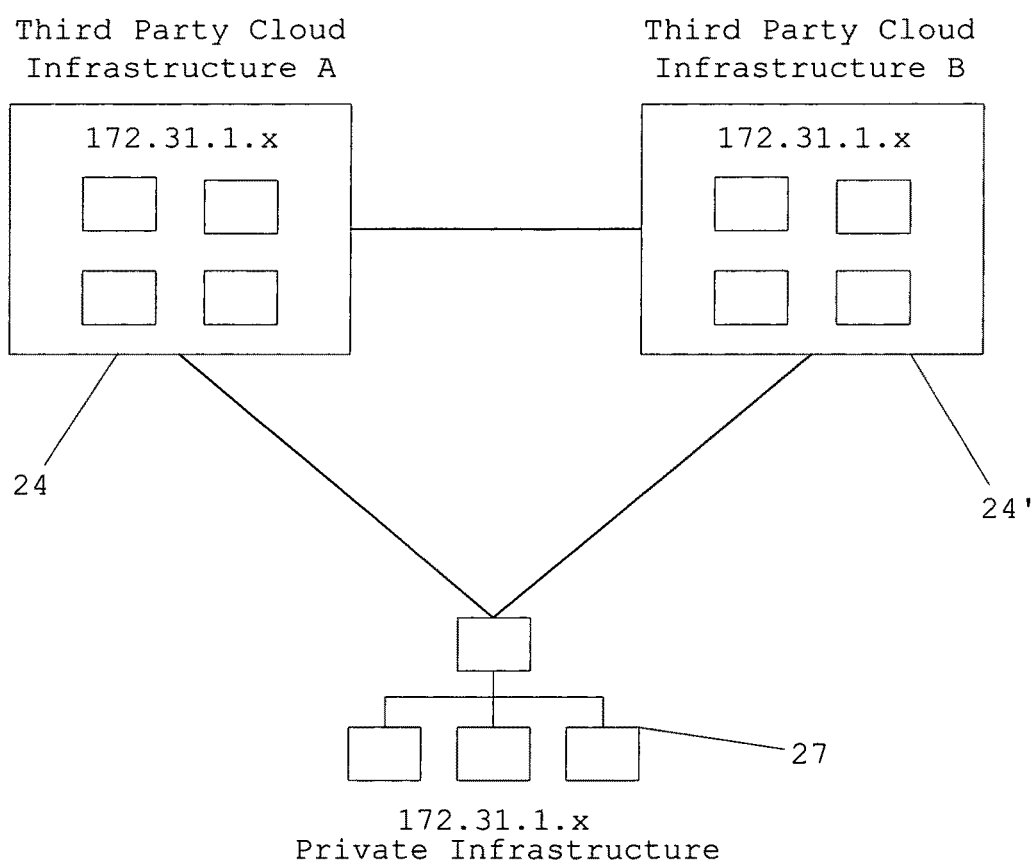
FIG. 9 shows a block diagram of two connected virtual networks in separate third-party clouds, as well as a connected private infrastructure in accordance with the present invention.

A further embodiment as shown in FIG. 9 allows the customer to link virtual networks in the third party clouds 24, 24' to an existing non-cloud type network 27. This embodiment allows the customer to use their existing architecture without converting it to a cloud-type environment and running a virtual network on it.

Figure 10:
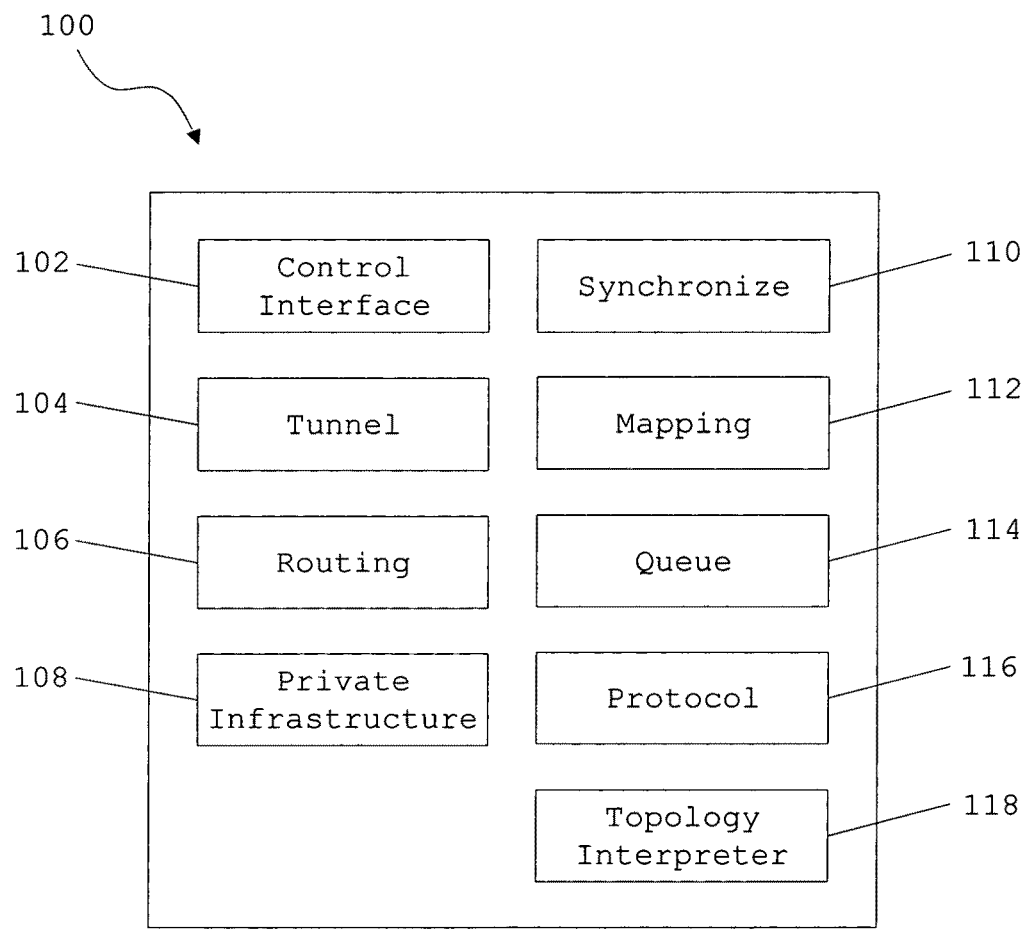
FIG. 10 shows a virtual network and its modules in accordance with the present invention.

The creation of a virtual network is carried out by a control module, virtual network manager or cloud VPN server. As shown in FIG. 10, the virtual network manager 100 comprises a series of modules. These modules can include but are not limited to a control interface module 102, topology interpreter module 118, tunnel module 104, private infrastructure integrator module 108, routing module 106, synchronization module 110, mapping module 112, protocol transmitter module 116, and queue module 114. Of course, some of these modules may be combined or not used at all, and other modules can be incorporated.

The control interface module 102 enables the customer to get and set various parameters which define the behavior of the virtual network. The control interface module 102 can take various forms, for example a UI or an API. FIG. 11 through FIG. 16 show a graphical UI (GUI) that can be used in an embodiment of the present invention. FIG. 11 depicts a GUI, which provides customer the ability to choose among functional operations to control facets of the overlay network. FIG. 12 depicts a GUI which provides a customer ability to generate a cryptographic keyset, which can than be consumed by synchronization and tunneling modules. Such a generation step consumes information from the topology mapping mechanism. FIG. 13 depicts a GUI which provides a customer the ability to provide information to the routing, tunneling, queuing, protocol transmission modules regarding the network location of other Cloud VPN Servers participating in a given overlay network. FIG. 14 depicts a GUI which provides a customer ability to trigger synchronization effects in the overlay network by allowing overlay network information such as cryptographic credentials, once generated, to be synchronized with other managers. FIG. 15 depicts a GUI which provides the customer ability to provide information to the routing, tunneling, queuing, and protocol transmission modules regarding the network location of a reciprocal device to the one shown in FIG. 13.

Figure 16:
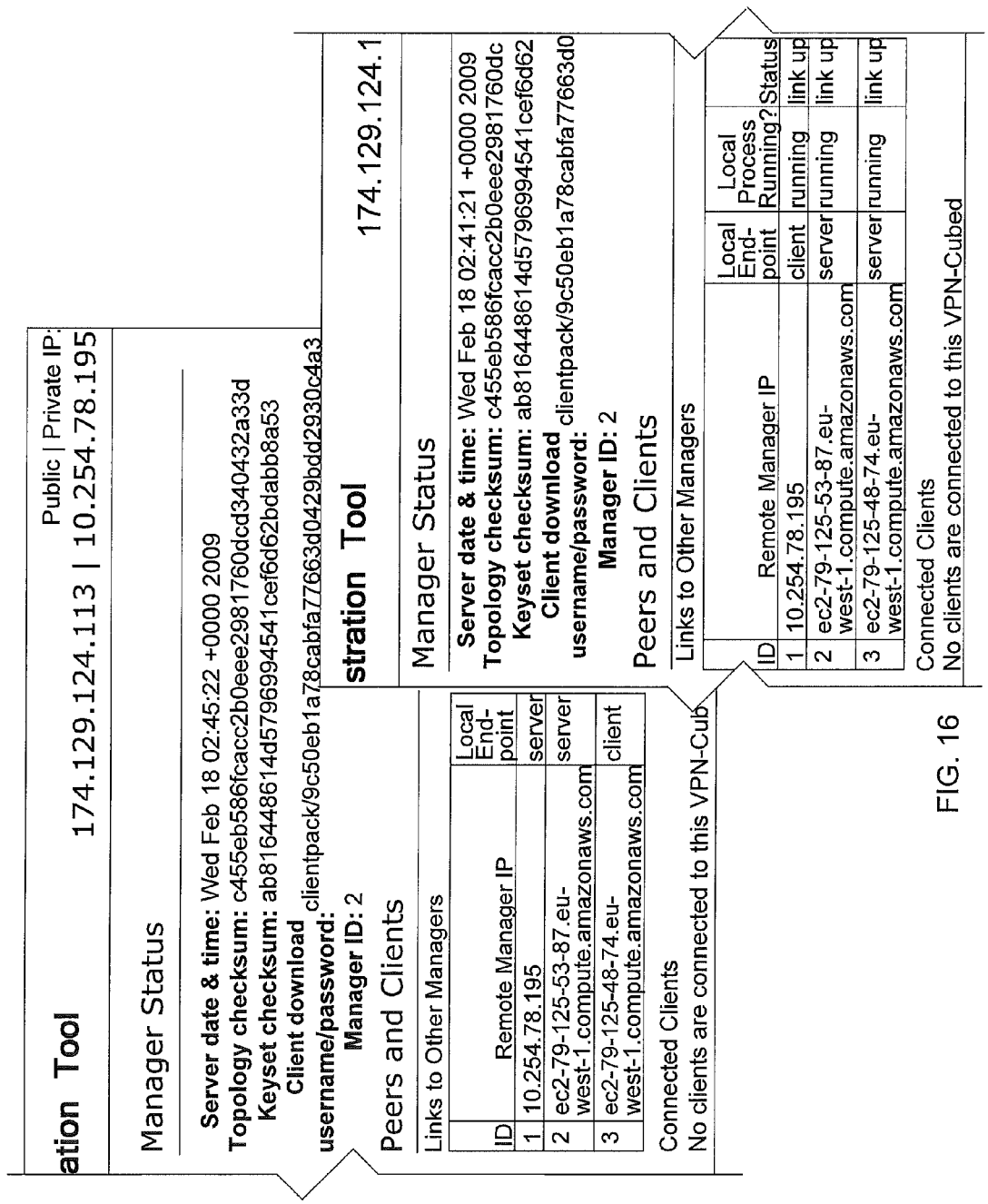
FIG. 16 shows a graphical user interface in accordance with the present invention.

FIG. 16 depicts a GUI which provides the customer ability to monitor the key parameters of an overlay network, with insight into its composition of a set of mutually identified Cloud VPN Servers and their respective queuing, routing, tunneling, and protocol transmission facilities. Additionally, it depicts addressing information provided to connected devices as well as visibility to connected private virtual infrastructure(s). The GUI gives a customer an easily accessible and understandable interface to effectuate needed parameter changes.

FIG. 17 shows an example prototype of an API that can be used in an embodiment of the present invention. FIG. 17 depicts examples of computer command line calls which would substantively provide similar capabilities to customers not wishing to use a GUI for effecting overlay network control. Such a command line API, similar to the GUI, allows the user to provide information to Cloud VPN Server modules and/or trigger interaction between them. Additionally command line functions exist which provide status information about the state of the overlay network, one of the cloud VPN servers, or one of its internal modules. For example, the "uploadLicense" command with a reboot flag set to "true" would allow a topology map in the form and/or metaphor of a license to be inserted into a cloud VPN server upon which a reboot would occur. In an embodiment the various modules of the cloud VPN server could be configured such that upon a reboot, the topology map is checked, interpreted, and parsed to provide new information about tunneling, topology, addressing, security and protocols to the appropriate modules, in turn triggering actions specific to that module. By allowing changes to the virtual network to be effectuated through an API the virtual network can be controlled in a programmatic fashion.

Figure 18:
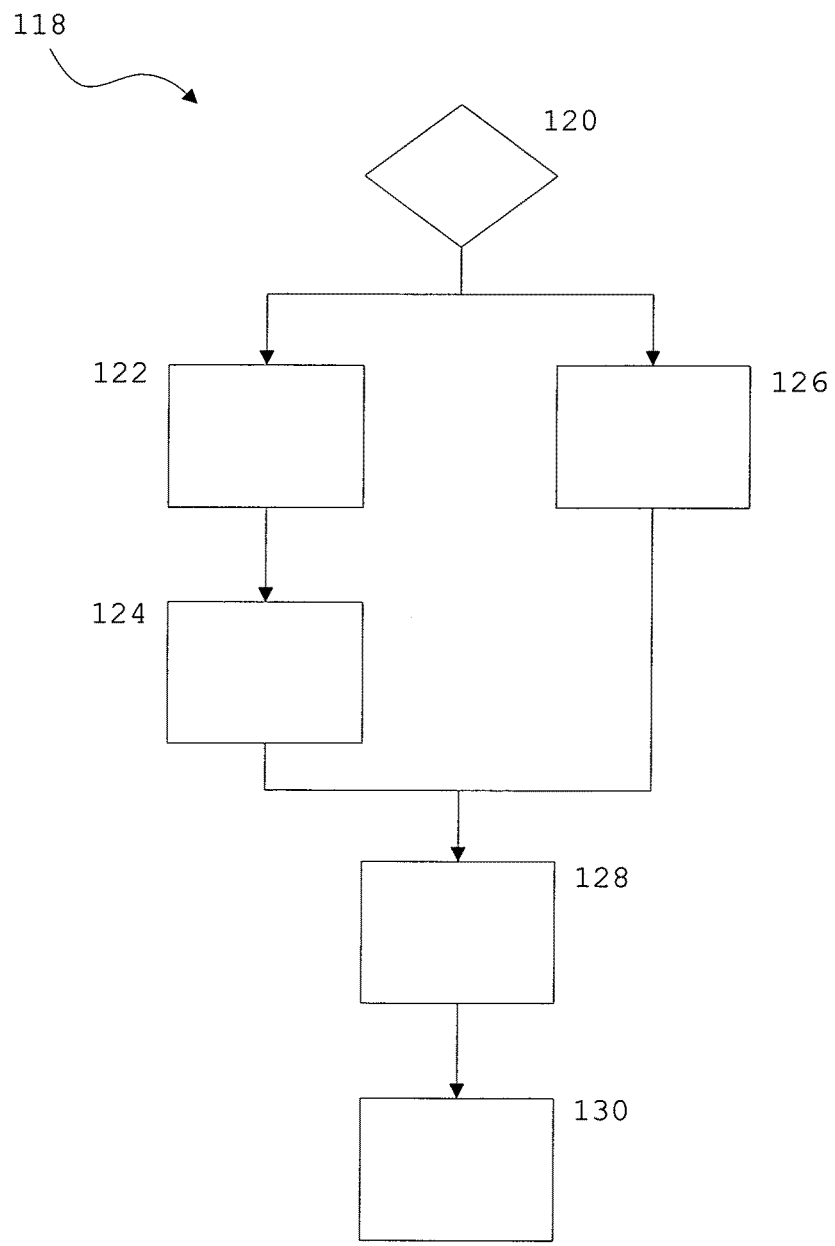
FIG. 18 shows a flow chart of a topology interpreter module in accordance with the present invention.

As shown in FIG. 18, the topology interpreter module 118 checks to see if a topology map is present on the local file system at 120. If a topology map is not found, the customer is prompted to upload an encrypted topology map in the form of a topology license at 122. The topology license is then uploaded and decrypted at 124. Alternatively, if a topology map is found on the local file system, that map is used at 126. In either case, the map is inspected and general parameters and links are identified at 128. The necessary tunneling, routing, and other supporting configuration files and templates are created at 130, which are then used by other modules.

Figure 19:
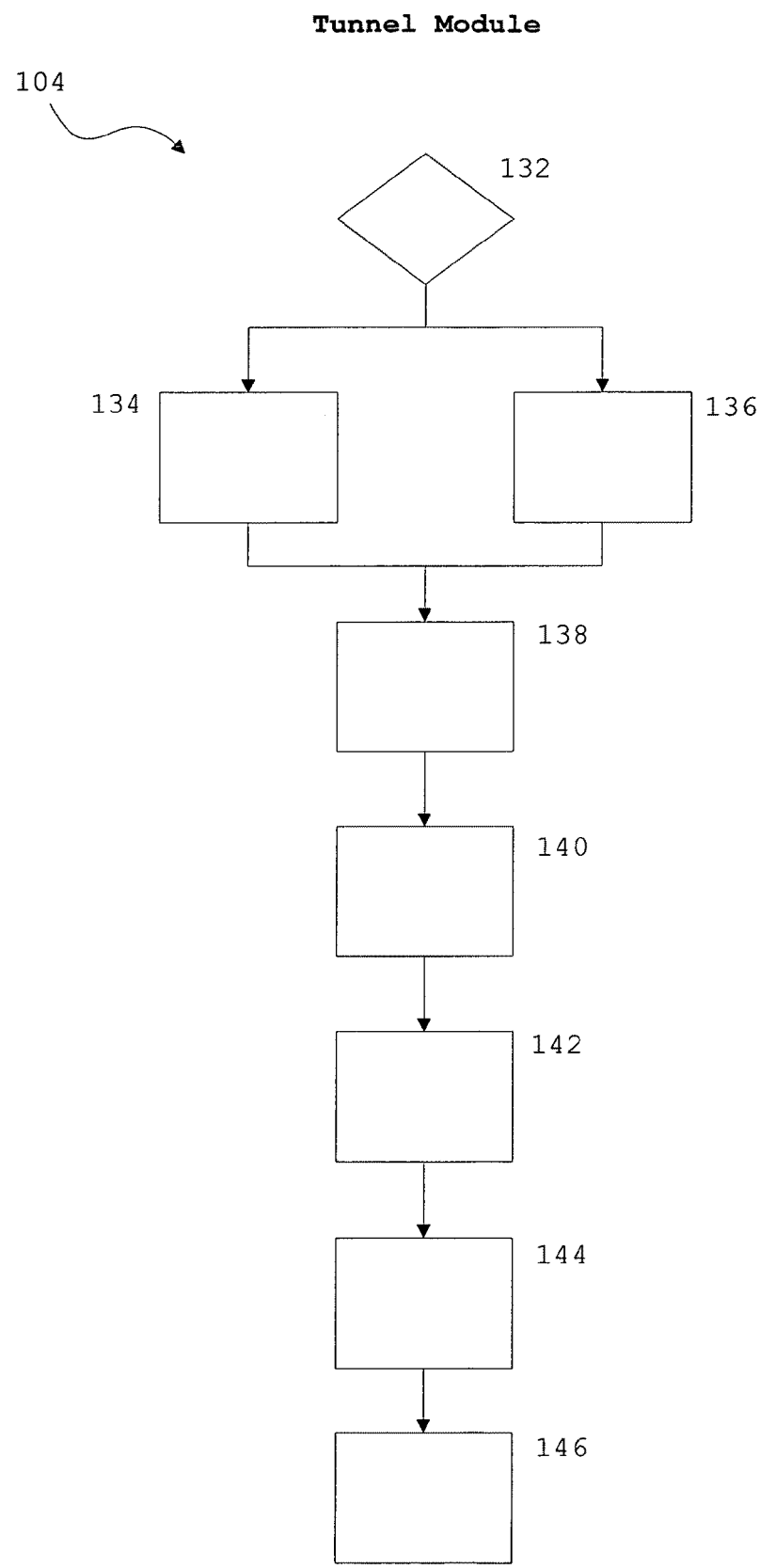
FIG. 19 shows a flow chart of a tunnel module in accordance with the present invention.

As shown in FIG. 19, the tunnel module 104 checks to see if a topology keyset has been generated at 132. If the keyset has been generated the keyset is downloaded from another virtual network manager in the same topology at 134. If the keyset has not been generated, a new keyset is generated at 136. In either case, files are extracted from the keyset archive into a directory for use by the VPN software at 138. In the preferred embodiment such software is OpenVPN. Alternative embodiments could use other software packages, such as Openswan. The configuration files and templates generated by Topology Interpreter Module are obtained at 140. Information about the real IP address of all the virtual network managers in the current topology are obtained at 142. In the preferred embodiments these IP addresses are obtained through a prompt in the UI. Based on the collected information configuration files are built, which are specific to the VPN package being used, at 144. The VPN package is started at 146. The tunnel can be based on encryption protocols, including but not limited to SSL, TLS, and SSH. Each of these protocols has multiple implementations that may be used.

Figure 20:
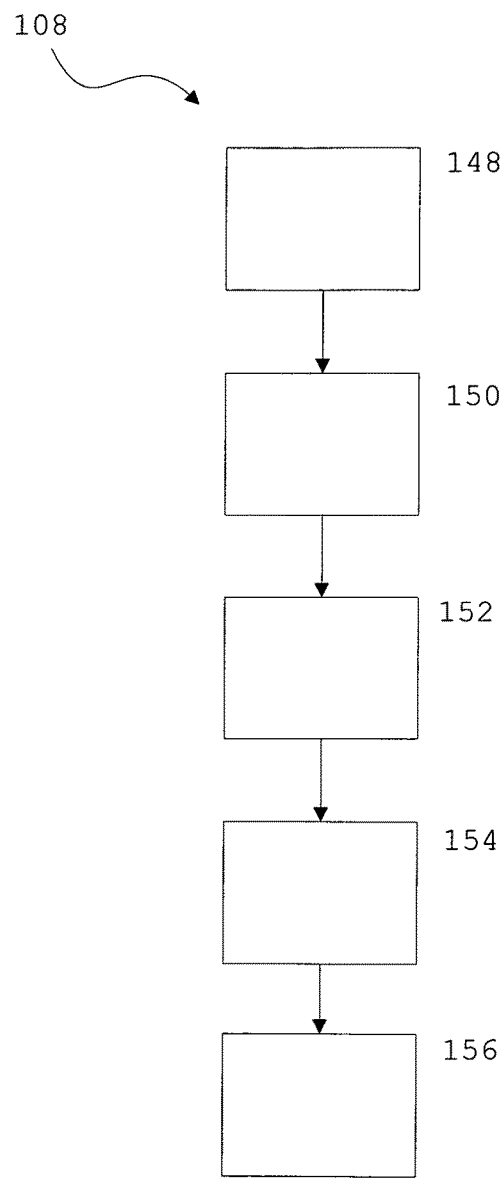
FIG. 20 shows a flow chart of a private infrastructure integrator module in accordance with the present invention.

As shown in FIG. 20, the private infrastructure integrator 108 module allows a connection to be established between the virtual network in the cloud and the customer's private infrastructure. Through the use of security protocols, information can be exchanged between the virtual network and the private infrastructure as if they were both part of one trusted network. To create this connection the private infrastructure integrator first obtains from the customer information about the connection point to the private infrastructure 148. For example, in an embodiment where the connection point is a Internet Protocol Security (IPsec) end point, the obtained information may be the IP address of the end point, the pre-shared key, and which of the customer's private subnets to integrate. Alternative embodiments may use SSL, TLS, or SSH encryption. Based on the obtained information, the private infrastructure creates a configuration file for connecting to the private infrastructure at 150, such as an IPsec configuration file. The necessary software to establish a connection to the private infrastructure, such as an IPsec application, is then started 152. When a connection, in the case of IPsec a tunnel, is established the subnets, which are to be integrated, are added to the virtual network at 154. For example the remote private subnets may be added to a dynamic routing protocol advertisement from the local manager. When the connection is closed, any subnets that where added as a result of the connection are removed at 156.

Figure 21:
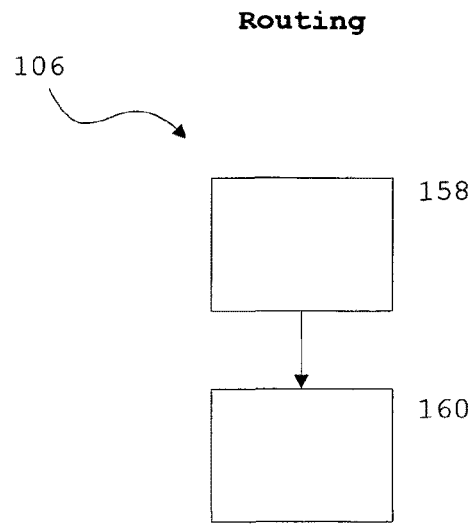
FIG. 21 shows a flow chart of a routing module in accordance with the present invention.

As shown FIG. 21 the routing module 106 gets the dynamic routing protocol configuration files generated by the topology interpreter, and installs them to a known location at 158. Then the routing software is started with the configuration file obtained in the previous step 160. In the preferred embodiments the dynamic routing protocol uses an implementation of Internet Engineering Task Force RFCs such as RFC 4271 and RFC 2858 which describes BGP, of which there are many implementations available in the market.

The synchronization module 110 (FIG. 10) uses the dynamic routing protocol to synchronize routes, and allows servers to share needed information. The synchronization module further synchronizes keys and certificates.

Figure 22:
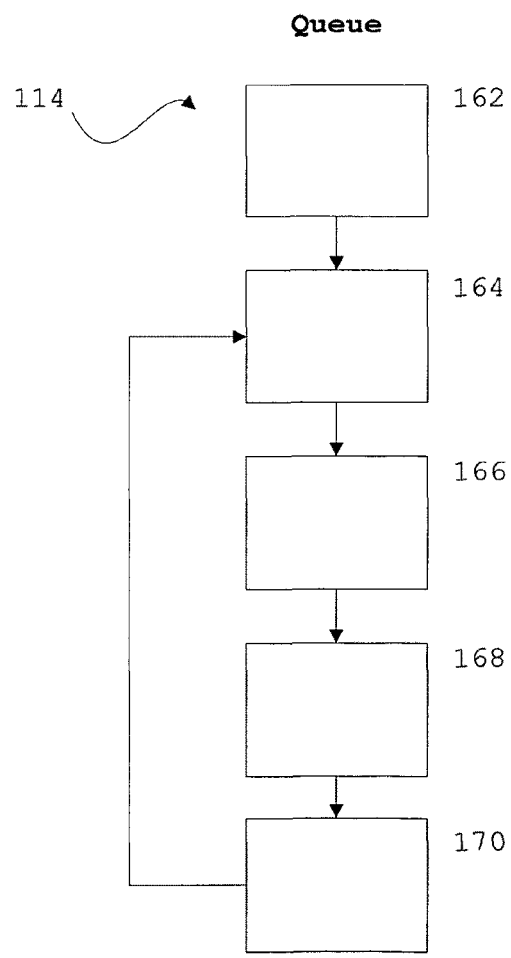
FIG. 22 shows a flow chart of a queue module in accordance with the present invention.

As shown in FIG. 22, the mapping module 114, maps static IP addresses to a set of credentials. The module first identifies the subnet from the topology definition or license file at 162. Then the next IP address is found from the data subnet eligible to be assigned to a client host at 164. A unique name for the set of credentials is picked at 166. For example a name may be generated based on the target IP address. Next a set of credentials with the unique name as a common name (CN) is generated at 168. A client-specific configuration file for a given CN with a push command for the corresponding IP address to the client is generated at 170. This could for example be done using OpenVPN's ifconfig-push command. The process repeats at 170 by returning to step 164.

The protocol transmitter module 116 (FIG. 10) comprises a protocol sniffer and a protocol re-transmitter. The protocol sniffer intercepts traffic as it moves over the network and then determines whether the traffic should be forwarded to the protocol re-transmitter. The protocol transmitter in turn accepts traffic from the protocol sniffer and retransmits the traffic, ready for distribution.

Figure 23:
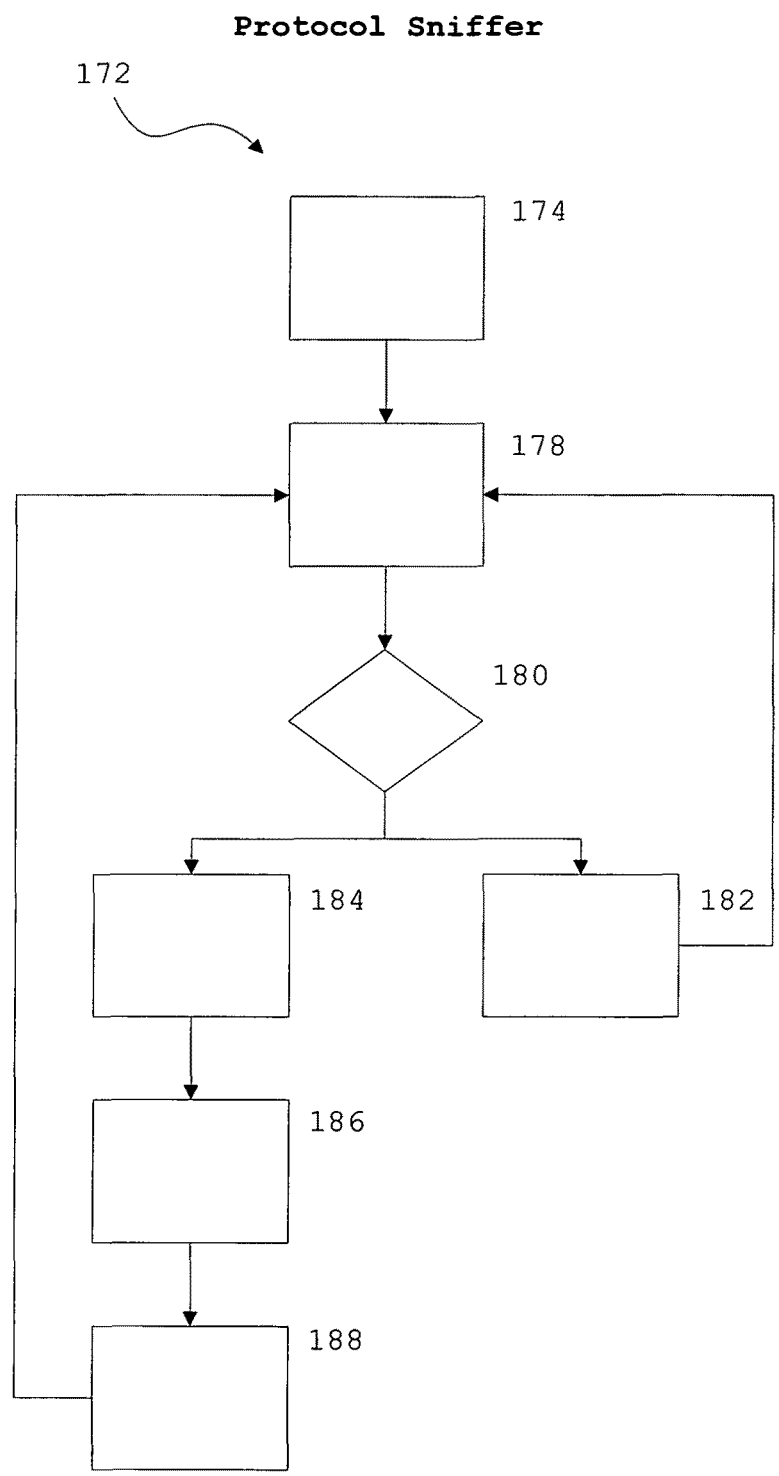
FIG. 23 shows a flow chart of a protocol sniffer in accordance with the present invention.

Shown in FIG. 23, the protocol sniffer 172 works by first setting up a sniffer to intercept targeted packets on the client-facing network interface at 174. The sniffer can be based in whole or in part on existing sniffer systems and frameworks, such as libpcap, which are well known in the art. The next sniffed packet is received from sniffer at 178, and a portion of the packet is checked for its relation to a predefined value or range at 180. In the preferred embodiment the packets time to live (TTL) value is checked to determine if it is greater than or less than a predefined value. In preferred embodiment the predefined TTL value is 250. Where that predefined value or range is not met, the packed is recognized as being already retransmitted by the protocol transmitter and the packet is ignored at 182. And, the protocol sniffer returns to step 178, where the next sniffed packet is received. Where the predefined value or range is met, the IP address and port of the source and destination, as well as the payload, timestamp, and other protocol data are extracted from the packet at 184. All or part of this extracted information is placed into a message at 186. In one embodiment the message is sent using a dynamic queuing mechanism. In the preferred embodiment the dynamic queuing mechanism is an implementation of the open standard AMQP managed by Twist Process Innovations LTD, a European Standards Organization.Twist Standard which described AMQP. There are many market available implementations of AMQP which may be used. Alternative embodiments may use a dynamic queuing machismo based on Java Message Services or commercial solutions like Tibco. At 188, the message is then sent to a collection for handling by the protocol re-transmitter. In one embodiment the message is published to a remote AMQP broker with the basic.publish AMQP command. The protocol sniffer then returns to step 168, where the next sniffed packet is received.

Figure 24:
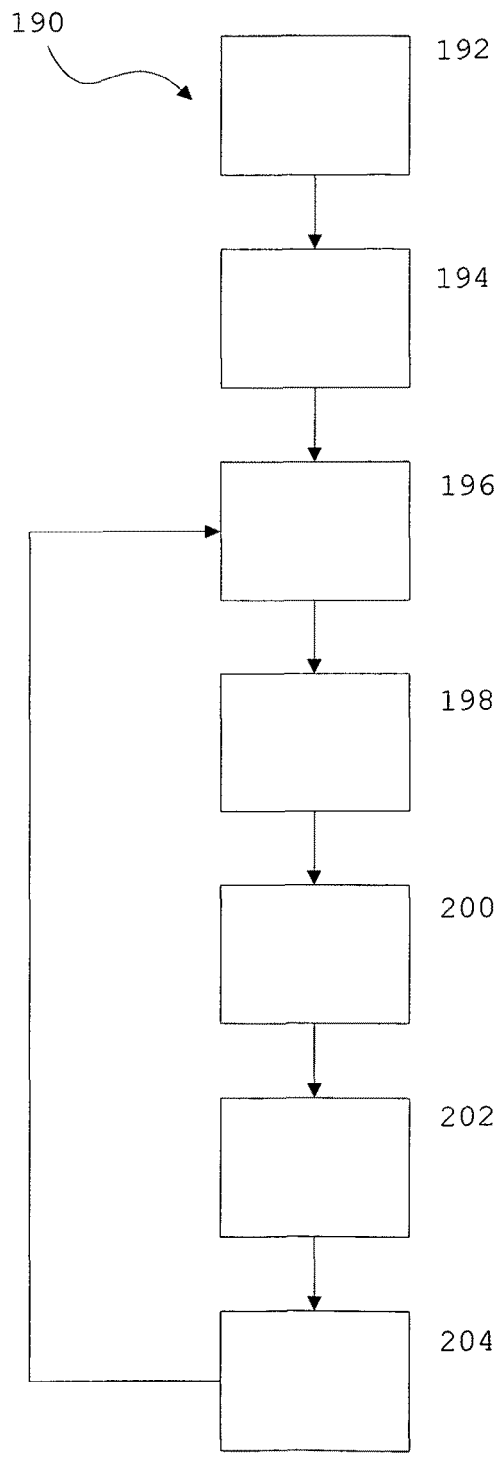
FIG. 24 shows a flow chart of a protocol re-transmitter in accordance with the present invention.

Shown in FIG. 24, the protocol re-transmitter 190 creates a collection for receiving messages from the protocol sniffer at 192, this collection is the queue module 114 (FIG. 10). In one embodiment the collection is a queue created in accordance with the dynamic queuing mechanism. In the preferred embodiment the queue is created on a local AMQP broker and bound to an AMQP exchange. The protocol re-transmitter is setup to retrieve message from the collection at 194. For example the basic.consume AMQP command can be used. A message is received at 196. In the case that AMQP is used it is received from the broker. The contents of the message are parsed and the headers and body are extracted at 198. A new packet is created in memory with the source and destination IP address and port, as well as, payload being based on the extracted values at 200. The value checked in protocol sniffer step 180 (FIG. 23) is set to a value that will evaluate true at 202. Referring back to the previously mentioned preferred embodiment, the TTL value is set to 250. The packet is put back onto the client-facing network interface at 204. The protocol re-transmitter then returns to step 196 and receives the next message.

One specific application of the protocol sniffer and re-transmitter is to allow the use multicast in cloud environments that do not otherwise support it. Multicast allows a single packet to be sent to multiple devices and nodes on the network at the same time. Because multiple devices and nodes are receiving the same packet, bandwidth is conserved compared to sending a separate packet to each device and node. Multicast is typically controlled at the hardware level, and is disabled in many cloud environments. However, many applications as well as service discovery and election mechanism are often built on multicast protocols. The protocol module enables the use of such applications, as well as service discovery and election mechanisms.

As described above, the present invention incorporates and utilizes computers, either as network devices 16 or as nodes 18 at the third-party cloud infrastructure level, over which the third party has control; or at the private infrastructure level, over which the customer has control.

Figure 25:
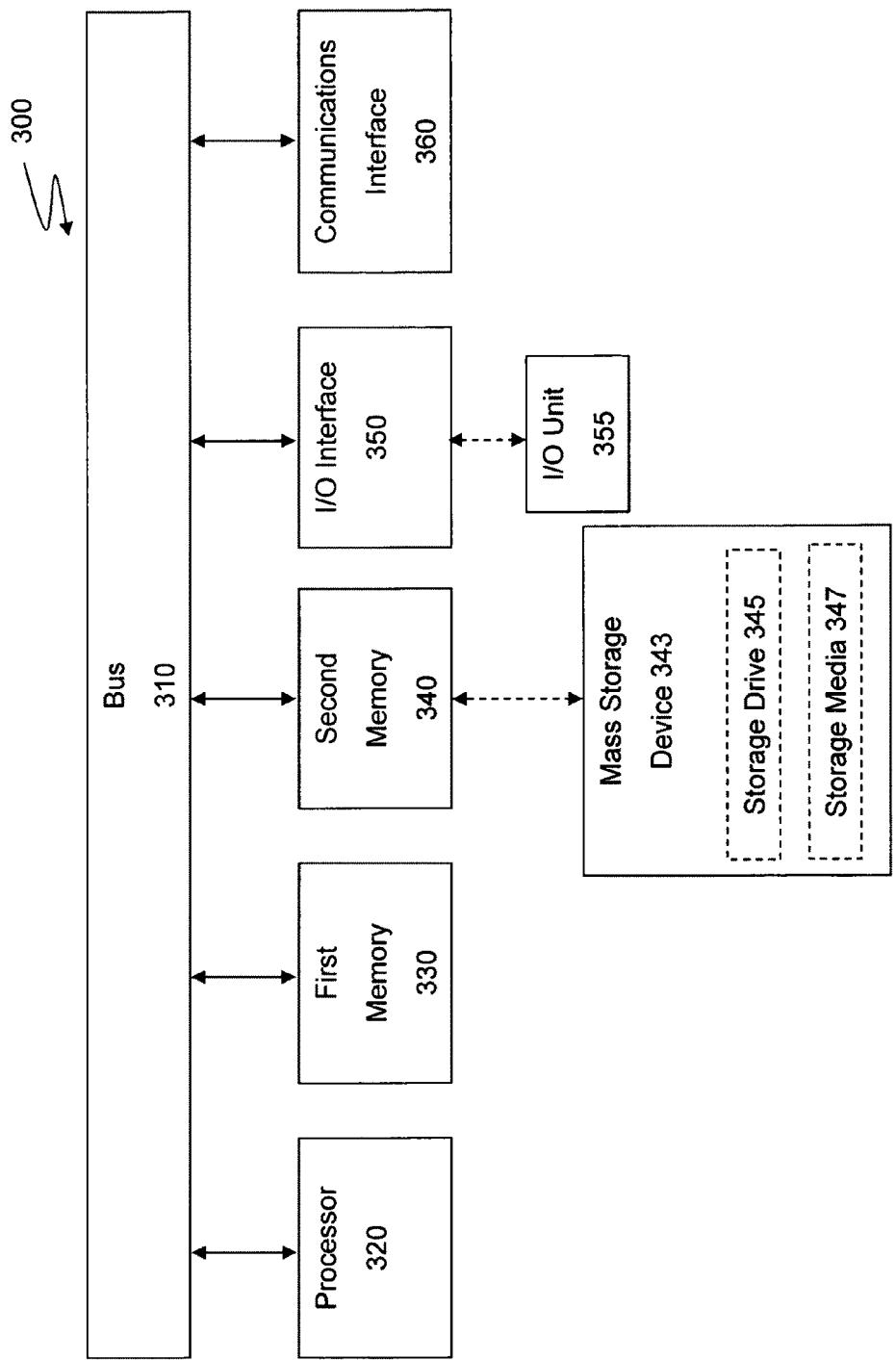
FIG. 25 illustrates an exemplary computer system 300, or network architecture, that may be used to implement the system and methods according to the present invention.

FIG. 25 illustrates an exemplary computer system 300, or network architecture, that may be used to implement the system and methods according to the present invention. One or more computer systems 300 may carry out the methods presented herein as the computer code described herein. One or more processors, such as processor 320, which may be a special purpose or a general-purpose processor is connected to a bus 310. Bus 310 can be used to connect the processor 320 to various other components of the system 300, but it is also contemplated that bus 310 may connect processor 320 to additional system components (not shown) such as gateways, routers, bridges, switches, hubs, repeaters, security devices, other computers, servers, virtual servers, communication servers, and graphics servers, among others.

It is also contemplated that bus 310 can connect the processor 320 to other computer systems as necessary. Via the bus 310, the processor 320 can receive computer code. The term "computer code" includes, for example, programs, modules, instructions, signals and/or data. The processor 320 executes computer code and may further send the computer code via the bus 310.

Computer system 300 may include one or more memories, such as first memory 330 and second memory 340. It is contemplated that the first memory 330, secondary memory 340, or a combination thereof function as a computer usable storage medium to store and/or access computer code. The first memory 330 and second memory 340 may be, for example, random access memory (RAM), read-only memory (ROM), a mass storage device, or any combination thereof.

As shown in FIG. 25, one embodiment of second memory 340 is a mass storage device 343, although it is contemplated that first memory 330 may be the mass storage device. The mass storage device 343 comprises a storage drive 345 and a storage media 347. It is contemplated that the storage media 347 may or may not be removable from the storage drive 345. Mass storage devices 343 with storage media 347 that are removable, otherwise referred to as removable storage media, allow computer code to be transferred to and/or from the computer system 300, and also to and/or from the cloud itself.

A mass storage device 343 may include, for example, a Compact Disc Read-Only Memory ("CDROM"), ZIP storage device, tape storage device, magnetic storage device, optical storage device, Micro-Electro-Mechanical Systems ("MEMS"), nano-technological storage device, floppy storage device, hard disk device. Mass storage device 343 also includes program cartridges and cartridge interfaces (such as that found in video game devices), removable memory chips (such as an EPROM, or PROM) and associated sockets.

The computer system 300 may further or alternatively include other means for computer code to be loaded into or removed from the computer system 300, for example, input/output ("I/O") interface 350 and/or communications interface 360. Both the I/O interface 350 and the communications interface 360 allow computer code to be transferred between the computer system 300 and external devices including other computer systems. This transfer may be bi-directional or omni-direction to or from the computer system 300.

Computer code transferred by the I/O interface 350 and the communications interface 360 are typically in the form of signals, which may be electronic, electromagnetic, optical, or other signals capable of being sent and/or received by the interfaces. These signals may be transmitted via a variety of modes including, but not limited to, wire or cable, fiber optics, a phone line, a cellular phone link, infrared ("IR"), and radio frequency ("RF") link.

The I/O interface 350 may be any connection, wired or wireless, that allows the transfer of computer code. An I/O interface 350 includes, for example, an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card.

In certain embodiments the I/O interface connects to an I/O unit 355, for example, a user interface, microphone, monitor, speaker, printer, touch screen display, etc.

The communications interface 360 is also any connection that allows the transfer of computer code. Communication interfaces include, but are not limited to, a modem, network interface (such as an Ethernet card), wired or wireless systems (such as Wi-Fi, Bluetooth, IR), local area networks, wide area networks, intranets, etc.

The present invention is also directed to computer products, otherwise referred to as computer program products, to provide software that includes computer code to the computer system 300, and to the cloud itself. Processor 320 executes the computer code in order to implement the methods of the present invention. As an example, the methods according to the present invention may be implemented using software that includes the computer code, wherein the software is loaded into the computer system 300 using a memory 330, 340 such as the mass storage drive 343, or through an I/O interface 350, communications interface 360, or any other interface with the computer system 300. The computer code in conjunction with the computer system 300 described herein may perform any one of, or any combination of, the steps of any of the methods presented herein. It is also contemplated that the methods according to the present invention may be performed automatically, or may be invoked by some form of manual intervention.

The computer system 300, or network architecture, of FIG. 25 is provided only for purposes of illustration and represents one of a number of similar computer systems 300 making up the cloud environment, such that the present invention is not limited to this specific embodiment. It is appreciated that a person skilled in the relevant art knows how to implement the present invention using any similar computer system or network architecture.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A network system for allowing a user control over user's assets in a third-party computing environment, said third party having control over most of said third-party computing environment, the system comprising a microprocessor, an input device, a memory, and a control module program, said control module program residing in said memory and said microprocessor being configured to execute said control module program, wherein said network system comprises:
   a third-party computing environment, said third party computing environment being made up of a physical and virtual infrastructure, said third-party computing environment further defined by at least one third-party computing environment parameter, said third-party having control over most or all of said physical infrastructure, said virtual infrastructure and said at least one third-party computing environment parameter;
   a first virtual private network, said first virtual private network configured to connect at least two assets of said user, said first virtual private network designed to overlay the third-party computing environment;
   a control module, said control module containing said control module program, said control module program capable of allowing for the creation of said first virtual private network;
   said control module program capable of allowing said user to set at least one virtual private network parameter, said at least one virtual private network parameter defining a behavior of said first virtual private network; said at least one virtual private network parameter comprising one of addressing, security encryption, routing, or enabling multicast protocols, such that said third-party computing environment has no knowledge of information pertaining to the at least one virtual private network parameter, and said user has control over said user's assets based on said behavior of said first virtual private network.

2. The network system of claim 1, wherein said third-party computing environment is a cloud computing infrastructure.

3. The network system of claim 1, wherein said physical and virtual infrastructure comprises one or more gateways, routers, bridges, switches, hubs, repeaters, security devices, other computers, servers, virtual servers, communication servers, and graphics servers.

4. The network system of claim 1, wherein said at least one third-party computing environment parameter comprises one or more addressing, security encryption, routing, enabling or preventing multicast protocols.

5. The network system of claim 1, wherein said at least two assets of said user comprises one or more gateways, routers, bridges, switches, hubs, repeaters, security devices, other computers, servers, virtual servers, communication servers, and graphics servers.

6. The network system of claim 1, wherein said control module is a virtual network manager.

7. The network system of claim 1, wherein said control module is a cloud virtual private network server.

8. The network system of claim 1, wherein said control module comprises one or more control interface modules, tunnel modules, routing modules, private infrastructure integrator modules, synchronization modules, mapping modules, queue modules, protocol transmitter modules, and topology interpreter modules.

9. The network system of claim 1, wherein said first virtual private network is a fault tolerant virtual network.

10. The network system of claim 1, further comprising a database, said database containing rules for directing at least one user data around the first virtual private network.

11. The network system of claim 10, wherein said database is user defined.

12. The network system of claim 1, further comprising a second virtual private network, said second virtual private network designed to overlay the third-party computing environment.

13. The network system of claim 12, wherein said second virtual private network contains at least one address that is identical to an address on said first virtual private network.

14. A machine-implemented method for allowing a user control over user's assets in a third-party computing environment, said third party computing environment being made up of a physical and virtual infrastructure, said third-party computing environment further defined by at least one third-party computing environment parameter, said third-party having control over most or all of said physical infrastructure, said virtual infrastructure and said at least one third-party computing environment parameter, the third-party computing environment made up of a network, a microprocessor, an input device, a memory, a control module, and a control module program, said control module program residing in said memory and said microprocessor being configured to execute said control module program, wherein said third party has control over most of said third-party computing environment, wherein said control module program comprises the steps of:

allowing for the creation of a first virtual private network, said first virtual private network configured to connect at least two assets of said user;

overlaying said first virtual private network over the third-party computing environment;

allowing said user to set at least one virtual private network parameter, said at least one virtual private network parameter to be used to define a behavior of said first virtual private network; said at least one virtual private network parameter comprising one of addressing, security encryption, routing, or enabling multicast protocols, such that said third-party computing environment has no knowledge of information pertaining to the at least one virtual private network parameter, and said user has control over said user's assets based on said behavior of said first virtual private network.

15. The machine-implemented method for allowing a user control over user's assets in a third-party computing environment of claim 14, wherein said third-party computing environment is a cloud computing infrastructure.

16. The machine-implemented method for allowing a user control over user's assets in a third-party computing environment of claim 14, wherein said physical and virtual infrastructure comprises one or more gateways, routers, bridges, switches, hubs, repeaters, security devices, other computers, servers, virtual servers, communication servers, and graphics servers.

17. The machine-implemented method for allowing a user control over user's assets in a third-party computing environment of claim 14, wherein said at least one third-party computing environment parameter comprises one or more addressing, security encryption, routing, and enabling or preventing multicast protocols.

18. The machine-implemented method for allowing a user control over user's assets in a third-party computing environment of claim 14, wherein said at least two assets of said user comprises one or more gateways, routers, bridges, switches, hubs, repeaters, security devices, other computers, servers, virtual servers, communication servers, and graphics servers.

19. The machine-implemented method for allowing a user control over user's assets in a third-party computing environment of claim 14, wherein said control module is a virtual network manager.

20. The machine-implemented method for allowing a user control over user's assets in a third-party computing environment of claim 14, wherein said control module is a cloud virtual private network server.

21. The machine-implemented method for allowing a user control over user's assets in a third-party computing environment of claim 14, wherein said control module comprises one or more control interface modules, tunnel modules, routing modules, private infrastructure integrator modules, synchronization modules, mapping modules, queue modules, protocol transmitter modules, and topology interpreter modules.

22. The machine-implemented method for allowing a user control over user's assets in a third-party computing environment of claim 14, wherein said first virtual private network is a fault tolerant virtual network.

23. The machine-implemented method for allowing a user control over user's assets in a third-party computing environment of claim 14, further comprising a database, said database containing rules for directing at least one user data around the first virtual private network.

24. The machine-implemented method for allowing a user control over user's assets in a third-party computing environment of claim 23, wherein said database is user defined.

25. The machine-implemented method for allowing a user control over user's assets in a third-party computing environment of claim 14, further comprising the steps of allowing for the creation of a second virtual private network and overlaying said second virtual private network over the third-party computing environment.

26. The machine-implemented method for allowing a user control over user's assets in a third-party computing environment of claim 25, wherein said second virtual private network contains at least one address that is identical to an address on said first virtual private network.

* * * * *